(12) United States Patent
Burachas

(10) Patent No.: US 8,933,882 B2
(45) Date of Patent: Jan. 13, 2015

(54) USER CENTRIC INTERFACE FOR INTERACTION WITH VISUAL DISPLAY THAT RECOGNIZES USER INTENTIONS

(71) Applicant: Giedrius Tomas Burachas, San Diego, CA (US)

(72) Inventor: Giedrius Tomas Burachas, San Diego, CA (US)

(73) Assignee: Intentive Inc., San Diego, CA (US)

( * ) Notice: Subject to any disclaimer, the term of this patent is extended or adjusted under 35 U.S.C. 154(b) by 0 days.

(21) Appl. No.: 14/144,515

(22) Filed: Dec. 30, 2013

(65) Prior Publication Data
US 2014/0184494 A1    Jul. 3, 2014

Related U.S. Application Data

(60) Provisional application No. 61/747,989, filed on Dec. 31, 2012.

(51) Int. Cl.
*G06F 3/033*     (2013.01)
*G06F 3/01*      (2006.01)
*G06F 3/03*      (2006.01)

(52) U.S. Cl.
CPC ............. *G06F 3/011* (2013.01); *G06F 3/0304* (2013.01)
USPC ............................ 345/157; 345/158; 715/863

(58) Field of Classification Search
CPC ...................... G06F 3/011–3/013; G06F 3/017
USPC .................. 345/156–158; 382/181, 185–189; 715/780, 863
See application file for complete search history.

(56) References Cited

U.S. PATENT DOCUMENTS

| | | | | |
|---|---|---|---|---|
| 6,434,255 B1* | 8/2002 | Harakawa | ...... | 382/103 |
| 6,531,999 B1* | 3/2003 | Trajkovic | ...... | 345/157 |
| 6,600,475 B2* | 7/2003 | Gutta et al. | ...... | 345/156 |
| 7,893,920 B2* | 2/2011 | Endoh | ...... | 345/156 |
| 8,149,210 B2* | 4/2012 | Klier et al. | ...... | 345/156 |
| 8,555,207 B2* | 10/2013 | Hildreth et al. | ...... | 715/863 |
| 8,614,674 B2* | 12/2013 | Binder | ...... | 345/158 |
| 2001/0043719 A1* | 11/2001 | Harakawa et al. | ...... | 382/106 |
| 2005/0248529 A1* | 11/2005 | Endoh | ...... | 345/156 |
| 2006/0239670 A1* | 10/2006 | Cleveland | ...... | 396/51 |
| 2010/0220288 A1* | 9/2010 | Cleveland | ...... | 351/206 |
| 2011/0083106 A1* | 4/2011 | Hamagishi | ...... | 715/836 |
| 2011/0115883 A1 | 5/2011 | Kellerman et al. | | |
| 2011/0248987 A1 | 10/2011 | Mitchell | | |
| 2012/0113092 A1 | 5/2012 | Bar-zeev et al. | | |

(Continued)

FOREIGN PATENT DOCUMENTS

WO    2009/150522 A1    12/2009

OTHER PUBLICATIONS

D.R. Schlegel, A.Y.C.Chen, C. Xiong, J.A.Delmerico, J.J.Corso, AirTouch: Interacting with Computer Systems at a Distance. 2011 IEEE Workshop on Applications of Computer Vision. pp. 1-8.

(Continued)

*Primary Examiner* — Priyank Shah

(57) ABSTRACT

Systems, methods, means and computer program products for identifying graphical objects are disclosed. Certain systems, methods, means and computer program products may identify a graphical object based on geometric relationships between two or more user body parts and the graphical object. Certain systems, methods, means and computer program products identify a graphical object based on analysis of pictorial images depicting positions of user body parts relative to each other.

7 Claims, 5 Drawing Sheets

(56) References Cited

U.S. PATENT DOCUMENTS

| | | | |
|---|---|---|---|
| 2012/0257035 A1 | 10/2012 | Larsen | |
| 2012/0320169 A1 | 12/2012 | Bathiche | |
| 2013/0229345 A1 | 9/2013 | Day et al. | |
| 2013/0311896 A1* | 11/2013 | Singh et al. | 715/743 |
| 2013/0326364 A1* | 12/2013 | Latta et al. | 715/751 |
| 2014/0028548 A1* | 1/2014 | Bychkov et al. | 345/156 |

OTHER PUBLICATIONS

M. Chen, L. Mummert, P. Pillai, A. Hauptmann, R. Sukthankar. Controlling Your TV with Gestures. *MIR'10*, Mar. 29-31, 2010.

H. Du, TH To, Hand Gesture Recognition Using Kinect. Boston University, Technical Report No. ECE-2011-04, Dec. 15, 2011.

I. Oikonomidis, N. Kyriazis, A.A. Argyros. Efficient Model-based 3D Tracking of Hand Articulations using Kinect. Proceedings of the 22nd British Machine Vision Conference, BMVC'2011, University of Dundee, UK, Aug. 29-Sep. 1, 2011.

Form PCT/ISA/220, PCT/US2013/0078388, "Notification of Transmittal of the International Search Report and the Written Opinion of the International Searching Authority, or the Declaration", 2 pages; Form PCT/ISA/210, PCT/US2013/0078388, "International Search Report", 3 pages; Form PCT/ISA/237, PCT/US2013/0078388, "Written Opinion of the International Searching Authority", 5 pages.

\* cited by examiner

USER CENTRIC INTERFACE FOR INTERACTION WITH VISUAL DISPLAY THAT RECOGNIZES USER INTENTIONS

CROSS-REFERENCE TO RELATED APPLICATIONS

This application claims priority under 35 U.S.C. §119(e) to U.S. Patent Application Ser. No. 61/747,989, filed Dec. 31, 2012, entitled User-Centric Interface for Interaction with Visual Displays that Recognizes User's Intentions, the content of which is hereby incorporated by reference herein in its entirety for all purposes

FIELD

One or more embodiments of this disclosure relate generally to systems and methods for identifying and manipulating a graphical object on a display. More specifically, one or more embodiments relate to identification of a graphical object based on geometric relationships between two or more user body parts and the graphical object.

BACKGROUND

Systems and methods that allow users to interact with computers often rely on manipulating input/output devices (e.g., a mouse, a keyboard, touch screen and the like). Many of these systems and methods identify such interaction from the perspective of the computer, not the user. Other systems that attempt to identify user interaction with a computer (e.g., vision tracking) from the user's perspective can require the user to maintain unnatural posture that is difficult to maintain over extended periods of time. Alternative systems and methods are needed that provide more intuitive user postures and movements for interacting with a computer based on the user's perspective.

SUMMARY

In accordance with the present disclosure, systems, methods and computer program products are described for identifying and manipulating a graphical object that is displayed on a screen. Certain systems, methods and computer program products may carry out the following steps: determine a position of a first body part of a user using a first video frame from a camera; determine a position of a second body part of the user using the first video frame; and identify a target object, from among graphical objects displayed on a screen, based on the position of the first body part and the position of the second body part.

DRAWINGS

The present application may be more fully appreciated in connection with the following detailed description taken in conjunction with the accompanying drawings.

DESCRIPTION

Figure 1:
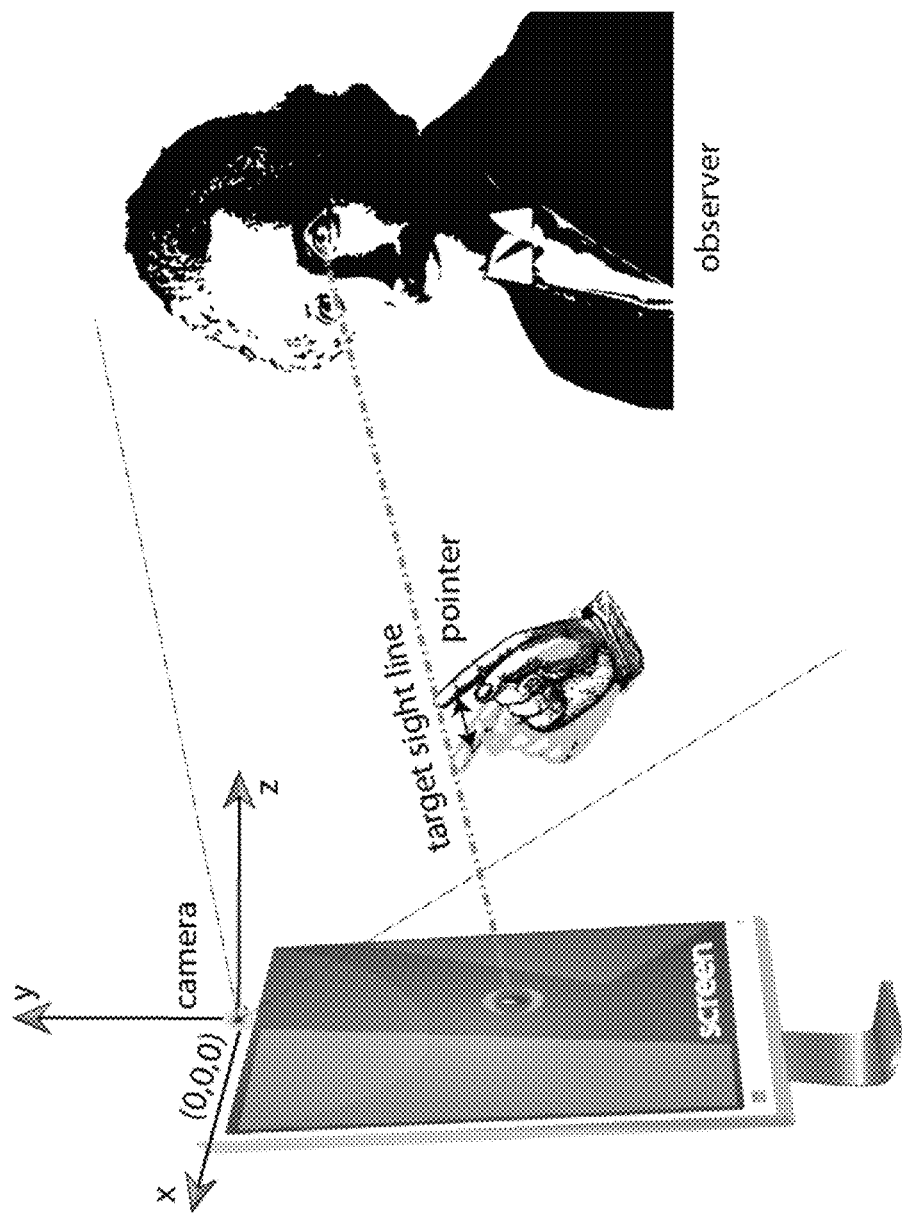
FIG. 1 shows a user environment for a user-centric interface (UCI) in at least one embodiment.

Various aspects of the disclosure are described below. It should be apparent that the teachings herein may be embodied in a wide variety of forms and that any specific structure, function, or both, being disclosed herein is merely representative. Based on the teachings herein one skilled in the art should appreciate that any aspect disclosed may be implemented independently of any other aspects and that two or more of these aspects may be combined in various ways. For example, a system may be implemented or a method may be practiced using any number of the aspects set forth herein. Additional details are provided in the examples below.

The present document describes aspects of various methods for accurate and convenient hand gesture-based identification and manipulation of graphical objects displayed on a screen of a TV, computer display, a projection screen attached to a computer, TV, mobile device screen or another information presentation device. Such graphical objects may be elements of a graphical user interface (GUI), as well as text and image objects generated by arbitrary software. Certain methods make use of a video camera and/or a depth camera (henceforth "the Camera") placed relative to a video display/monitor/screen (the Screen) in a known manner. The physical measurements of the Screen and geometrical relationship between the Screen and the Camera are either known in advance or estimated using the Camera or other auxiliary devices (such as magnetometers and short-range precise localization devices).

One distinction of certain, but not necessarily all, embodiments as compared to prior art is facilitation of remote computer-human interaction, without touching the computer screen, via simultaneous detection and tracking of at least two user's body parts: head/eye position and pose as well as hand/finger position and pose relative to the Screen. The head/eye position tracking is used for the purpose of calculating the hand and the Screen position in the user's visual field. Such approach recalculates the Camera/Screen/Head/Hand configuration in user-centric coordinate system (e.g., a vision or head-centered coordinate system in one embodiment), and thus facilitates tracking user's actions and intentions from the user's perspective. A user interface that tracks the user's perspective rather than the perspective of a camera is called User-Centric Interface (UCI). The user-centric principle greatly simplifies interpretation of user's interaction with a computer/TV screen.

Certain implementations of a UCI differs from other hand gesture-based UIs in that in addition to hand tracking and gesture recognition, they also use face/eye tracking and dual projective perspective constraints (that of the Camera and of the user) for the purpose of identifying (e.g., calculating) regions of the Screen that a user intends to address/manipulate. Moreover, the UCI recognizes dynamical hand/finger gesture patterns that are generated when UCI is manipulated in a manner imitating hand gestures aimed at a touch-screen of modern computing devices (tablets, smart phones, all-in-ones), thus providing user experience of control immediacy similar to that offered by touch-screens albeit virtually, without a need to approach and touch the Screen.

Description of UCI Components in Some, but not Necessarily All, Embodiments (1) One component of the UCI functions as follows: A user points one or more fingers toward the Screen in such a manner that in his/her visual field the fingertip is superimposed over a graphical object (e.g. a GUI element) to be manipulated (see FIG. 1). From the user's perspective the user's hand/fingers are positioned to point/occlude parts of the screen that can be manipulated using the traditional mouse/cursor or touch-screen GUI (such as window move, resize, scroll, select menu item or a button and more sophisticated widgets as well as other graphical/textual objects that can be manipulated via appropriate software).

The stereo-parallax that results when an observer fixates binocularly on one object (such as fingertip) but pays attention to another distant object (image on the screen) is handled by performing geometrical calculations relative to the dominating eye. From the user's perspective such a choice results in unambiguous correspondence between a monocular image (via the dominating eye) of the fingertip and the graphical element intended for manipulation.

(2) Another component of the UCI is a hand/finger gesture recognition subsystem, capable of detecting dynamic hand/finger movement patterns that correspond to a user's interaction with virtual (imaginary) surface. Such dynamic patterns include sudden deceleration of hand motion aimed towards the Screen (imitating touching of a virtual surface), as well as highly controlled, precise manipulation gestures with one, two or more fingers along the imaginary surface imitating dragging, swiping, or pinch gesture on a touch-screen or touchpad.

Implementation of UCI in Some, but not Necessarily All, Embodiments

In certain embodiments, the basic components of UCI include (1) a video camera (such as a webcam) and/or depth camera; (2) a face/eye detection and tracking algorithm that is applied on the video stream generated by the camera; (3) a user-centric dual perspective projection algorithm for estimation of the geometry of the hand/eye/screen configuration from user's perspective; (4) a hand/finger dynamic gesture detection and tracking algorithm applied on the said stream. The UCI works in conjunction with a GUI and/or other software components that present graphical elements on the Screen.

There are two possible embodiments of UCI: that based on a video (RGB or BW) camera and that based on a depth camera (such as Kinect®, PrimeSense/Xtion®, etc.). Any depth and/or RGB camera of sufficient spatial and temporal resolution is suitable for building the UCI. Likewise, any computer vision face/eye tracking algorithms of sufficient robustness can be employed as aforementioned component 2. The combination of the above components with the user-centric dual perspective-projection algorithm and the dynamic hand/finger tracking principle, however, are the unique aspects of certain methods described herein.

Figure 2:
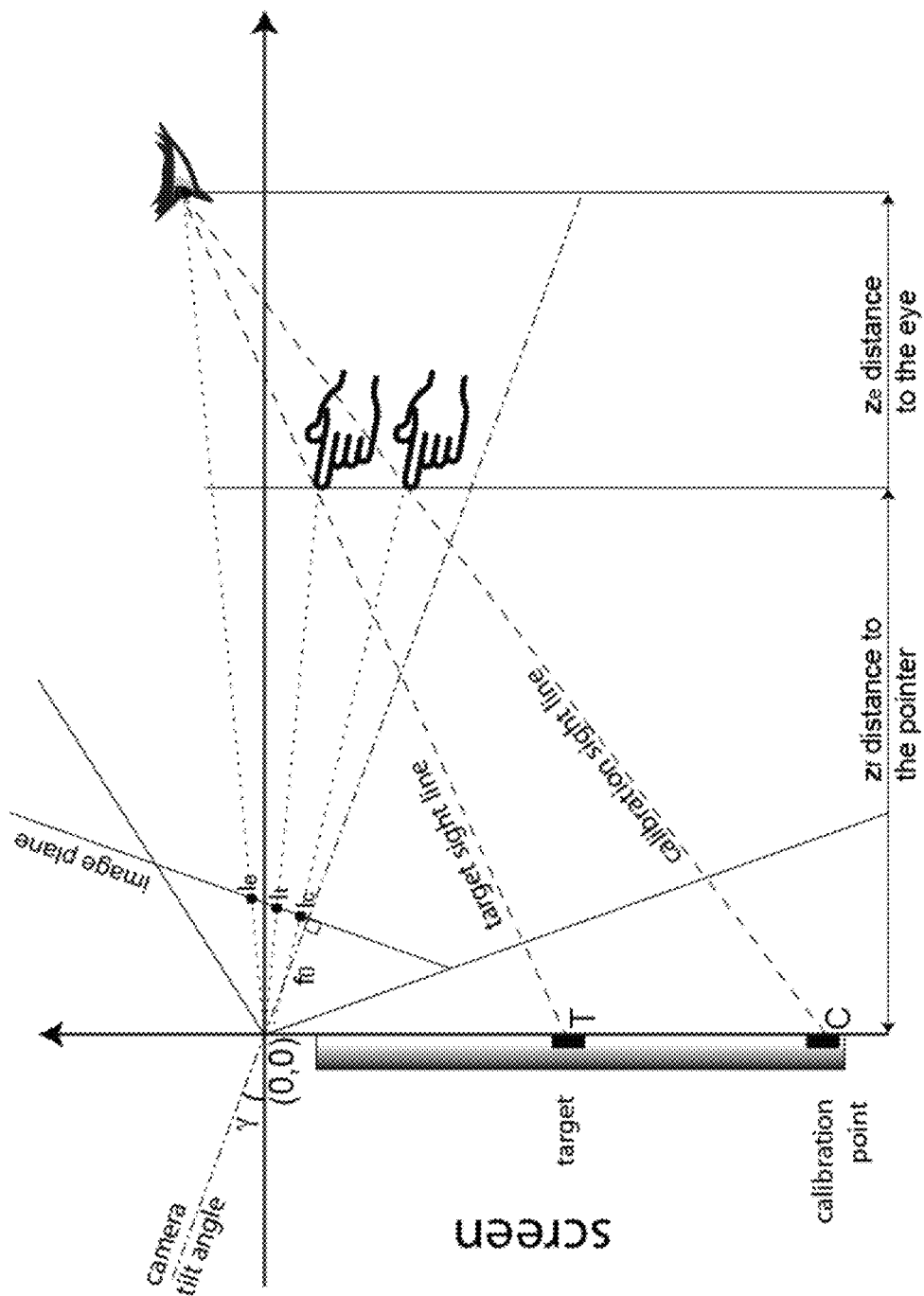
FIG. 2 shows a 2D example of the geometrical dual-perspective configuration that the UCI employs for calculation of the pointed-at on-screen locations from the Camera images of an eye and fingertips in at least one embodiment.

FIG. 2 depicts a simplified 2D version of the geometrical configuration used in the UCI. The problem that the dual perspective-projection algorithm solves is mapping of hand/fingertip location on the Camera image to coordinates on the Screen. The image point It corresponds to a projection of the pointing fingertip onto the image plane at the time when a user is pointing at the on-screen target T relative to the user's eye. Likewise, the image point Ic is a projection of the fingertip at the time when it points at the on-screen calibrating point C, i.e. point whose Screen coordinates are known. Finally, the point Ie is the location of the eye projection onto the image plane. The focal length of the camera f0 and the camera tilt angle in addition to screen parameters (width and height as well as position relative to the Camera) are used in the camera image-to-screen mapping.

FIG. 2 shows a 2D example of the geometrical dual-perspective configuration that the UCI employs for calculation of the pointed-at on-screen locations from the Camera images of an eye and fingertips. The origin of the coordinate system corresponds to the camera pinhole. For each video frame, fingertip and eye positions It,c,e are estimated using computer vision algorithms. In case of the depth camera the absolute distances to fingertip (zf) and the eye (ze) are known and the algorithm can be employed without initial calibrating pointer gesture. In case of the 2D RGB camera these distances are not known, but are eliminated from on-screen target location computation via a calibrating gesture aimed at an on-screen calibration point.

The user-centric dual-perspective approach can be employed both with a depth and 2D (RGB or BW) cameras. Since a depth camera provides information about the absolute distance from the camera to the eye and fingertip, the camera image-to-screen mapping can be calculated without a calibration step. By contrast, for a setup where only a 2D camera is employed, the missing depth information needs to be factored out from the mapping by means of a calibration step.

When the distance information is available, the mapping to the screen coordinates from the physical eye and fingertip positions estimated using a depth camera is a 3D geometry problem of finding the point of intersection of the gaze line determined by the eye position and fingertip points with the screen plane: The 3D position vector s belonging to the screen plane in the coordinate system shown in FIG. 1 can be defined as $(s-c0)\cdot n=0$, where vector c0 is the origin of the coordinate system (coinciding with the camera pinhole and assumed to be on the screen plane without the loss of generality) and n is the normal vector to the screen plane. The line determined by the fingertip-eye points can be parametrically defined as $l=e-t(e-f)/\|e-f\|$, where f is position vector of the fingertip, e is that of the eye, and t is a scalar in the real number domain. By equating the above plane and line equations the intersection point is solved to be at $t_i = \|e-f\|(c0-e)n/[(e-f)n]$. Then the intersection point $l_i = e - t_i(e-f)/\|e-f\|$ needs to be checked as to whether it falls within the screen extent and is targeting a relevant graphical on-screen element.

The case when the distance information is missing (as when employing an RGB camera) is more elaborate and is illustrated for the 2D case: Given the configuration as in FIG. 2 and assuming, without loss of generality, that while pointing gestures are performed the fingertip moves approximately within a virtual "proxy" plane at an arbitrary fixed distance from the Screen, the vertical position Yf of the fingertip can be calculated up to a scaling factor determined by the distance zf. This relative calculation is equivalent to calculation of fingertip sight line intersection with an arbitrary plane parallel to the screen.

Figure 3:
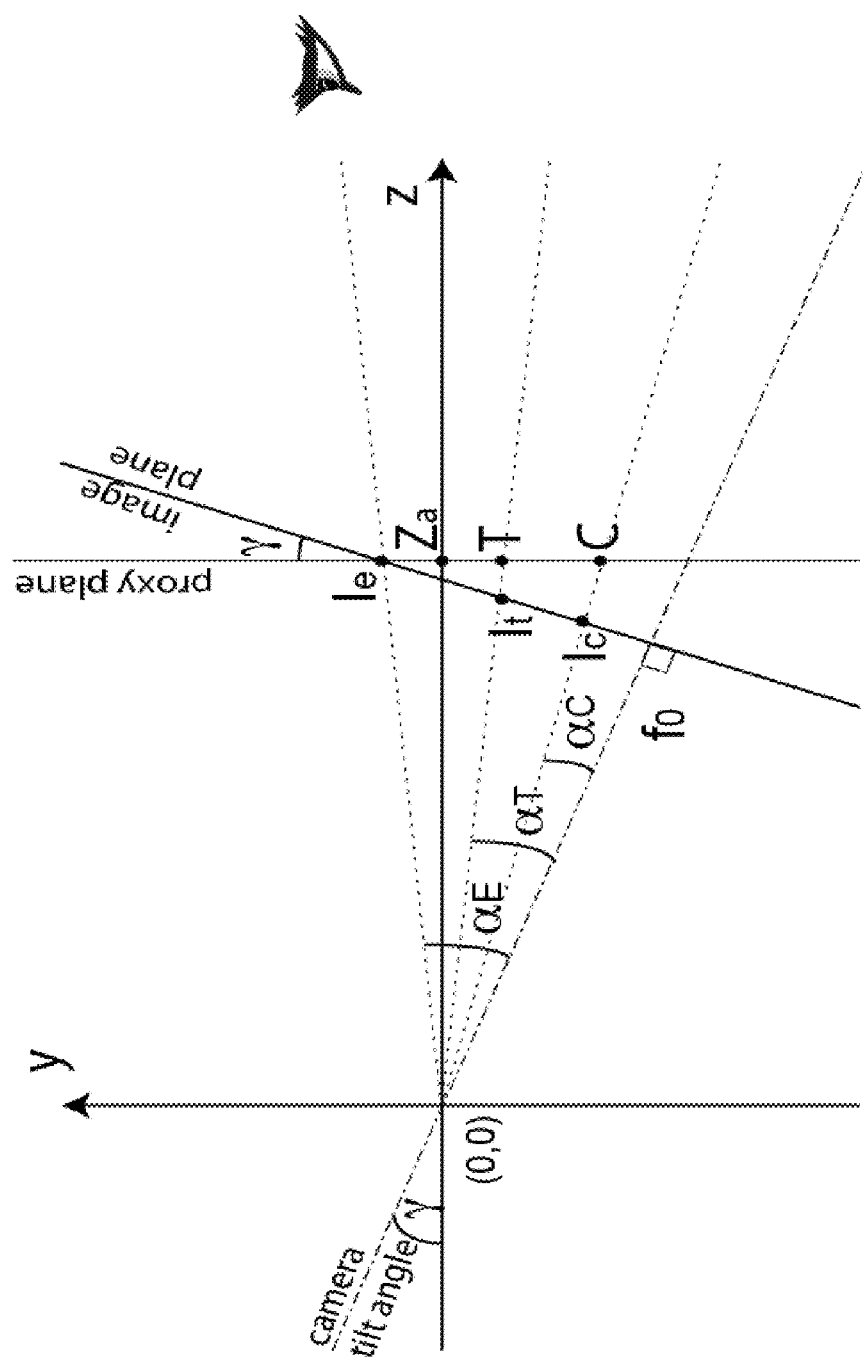
FIG. 3 depicts a 2D illustration of the calibrated homography used for estimation of the mapping between camera images of the eye and hand/finger positions and the Screen in at least one embodiment.

For simplicity we choose a plane that intersects the image plane at the eye projection Ie (see FIG. 3). Then za is the distance along the z-axis between the screen/camera (0,0) and the image point Ie. Denoting the segment [0,Ie] as $w_e = \sqrt{f_0^2 + I_e^2}$, we get $z_a = w_e \cos(\alpha_E - \gamma)$. The points of intersection on the proxy plane of the paths between camera and finger positions corresponding to calibration and target lines-of-sight then are $Y_C = z_a \tan(\gamma - \alpha_C)$ and $Y_T = z_a \tan(\gamma - \alpha_T)$, respectively. The angles $\alpha_C = a\tan(I_C/f_0)$ and $\alpha_T = a\tan(I_T/f_0)$ are (vertical) visual camera angles of the fingertip pointing at the control and target points, respectively.

Next, in at least one embodiment, since the proxy plane is parallel to the plane of the Screen, one can map fingertip coordinates to the screen once the image of a single calibrating point (with known screen coordinates) is given. This idea is illustrated for the Y-dimension first.

Consider points T and C in FIGS. 2 and 3: ratio of distances (from the camera along the y-axis) between these points is proportional to the ratio of distances (along the y-axis) between the point of the eye-camera line and proxy plane intersection and the fingertip Y coordinate of the intersection between the fingertip sight line and the proxy plane. From this observation we derive a scaling factor $\mu=(S_C-S_0)/(Y_C-Y_e)$, where $S_C$ is the vertical screen coordinate of the calibration point and $S_0$ is the (extended) screen coordinate of the camera. Then the coordinate of an arbitrary on-screen target point is simply $S_T = \mu Y_T$. The horizontal target on-screen coordinate is calculated analogously.

Thus, once the location of the fingertip on the camera image is recorded at the moment when the fingertip is pointing to a known calibrating point, the correspondence is then established between the fingertip location on the RGB camera image and the Screen.

Note that maintaining this correspondence does not require static head/eye position as after calibration the head may be tracked and shifts in the user's point of regard can be corrected (e.g., as long as the head translation is parallel to the screen).

Additional improvements in accuracy can be achieved by using statistics of head sizes as a prior in the Bayesian version of the discussed target position estimation. Since head sizes vary relatively little the approximate distance to the eye can be estimated from head size. Further accuracy improvements can be achieved by means of a calibrating picture of the user's face at a known distance. Then such a picture can be used in the following manner: the distance between two salient facial features (such as distance between the eyes) is used as a reference for estimation of the distance between the screen plane and the head/eye.

FIG. 3 depicts a 2D illustration of the calibrated homography used for estimation of the mapping between camera images of the eye and hand/finger positions and the Screen. The proxy plane approach for mapping camera image to screen coordinates can be generalized to more realistic cases when fingertips during pointing behavior move not in plane parallel to the screen but in plane at an arbitrary angle to the screen plane as well as to the spherical surface (generated via palm/hand joint rotation). This generalization can be achieved by making use of additional calibration points.

Recognition of Intentional Gestures in Some, but not Necessarily All, Embodiments In some embodiments, one component of the UCI is a set of hand dynamics recognition algorithms that can detect intentional hand and body gestures that are aimed at controlling on-screen graphical elements.

An observation in distinguishing intentional controlled hand gestures and free-swing gestures is that hand movements become extremely precise during controlled manipulation. That is, while during free-swing hand trajectories are highly variable and stop-points (no-motion intervals) are brief, during controlled hand manipulation hand dynamics is more stereotyped with rapid accelerations/decelerations followed by extended intervals of quiescence ("stop-points") that last a rather fixed (sub-second) duration (see FIG. 4).

Thus these two types of hand motion can be distinguished by analyzing parameters of hand dynamics such as patterns of acceleration. Machine learning algorithms for detecting such stereotyped acceleration patterns can be employed, including simple detection in an appropriate feature space using linear Fisher discriminants or support vector machines (SVM) and ending with more advanced machine learning tools such as on-line nonnegative matrix factorization (NMF), decision forests, and Bayesian Graphical Models.

Direction of hand motion provides additional constraints: hand gestures that imitate those of touch-screen manipulation are aimed towards the Screen. The screen-bound direction of hand gestures can be detected directly as a hand/fingertip distance change when using a depth camera or by means of optical flow calculation when using a 2D camera.

The controlled hand gestures that are not related to UCI (i.e. hand gestures aimed at objects unrelated to screen control) thus can be partially filtered out based on their direction of motion. Similarly, dynamical pattern of motions of the hand intended for manipulation of on-screen graphical objects (such as a swipe of a hand intended to scroll images or text) differs from casual hand swings. Our algorithm learns to detect dynamical patterns of intentional hand gestures and discriminates them from hand gestures not intended for on-screen manipulation.

Figure 5:
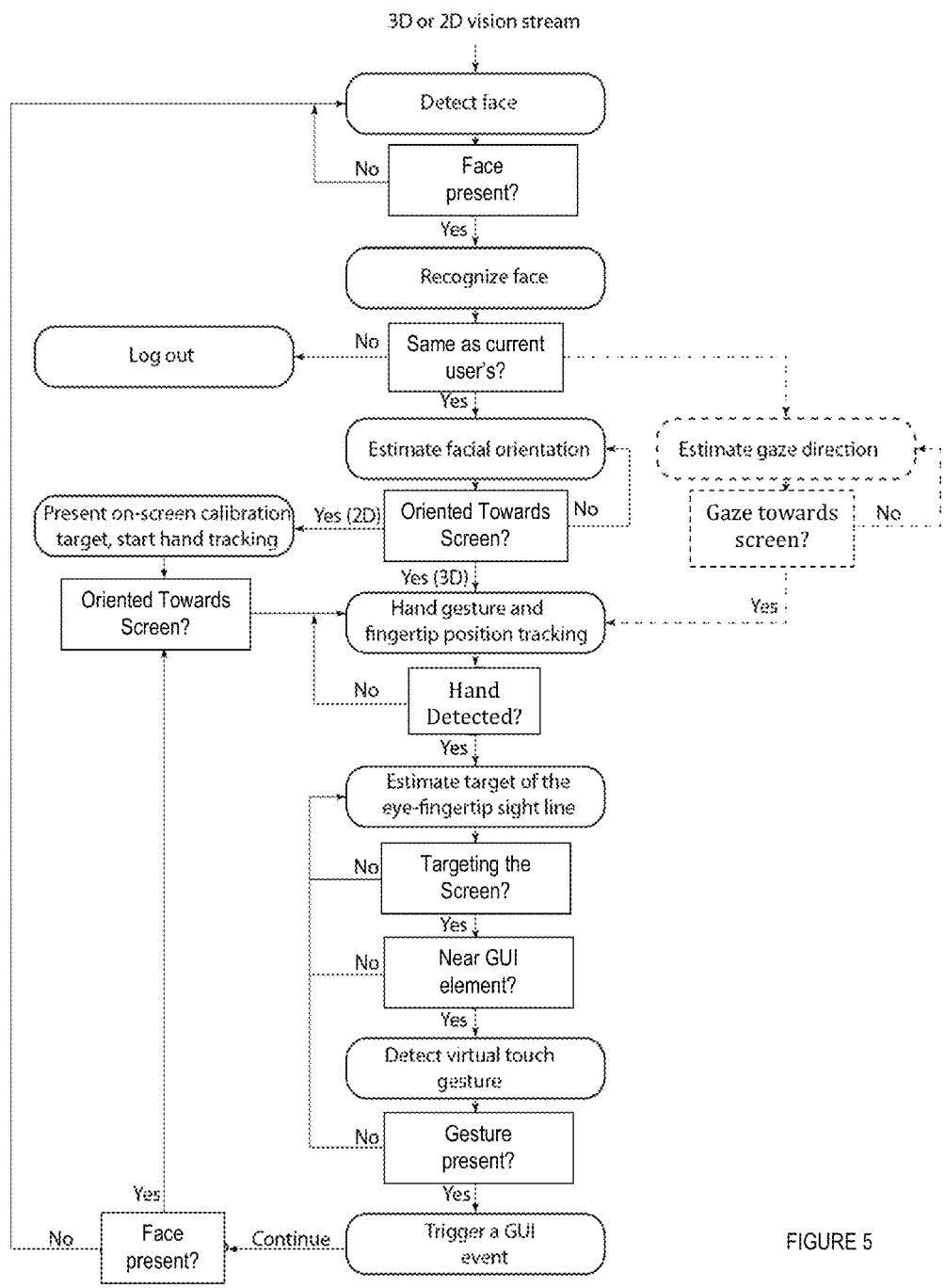
FIG. 5 depicts a flow chart illustrating how a UCI can be implemented in software in at least one embodiment.

An additional indicator that can be employed for determining user's intent to interact with the Screen is orientation of the face: if the user's face is oriented towards the Screen that increases the probability that user's hand gestures are intended for interaction via the UCI (see FIG. 5). Similarly to hand gestures, the dynamics of the turn of the head, orientation of the face towards the Screen and overall body pose depends on user's intention: the dynamics of an intentional head orientation with the goal of interaction with the screen differs from that of just a casual inspection of the screen. Likewise, the pattern of approach of a person towards the Screen also reflects his/her intention and our algorithm learns to discriminate a user's intentions based on such dynamic patterns.

Figure 4:
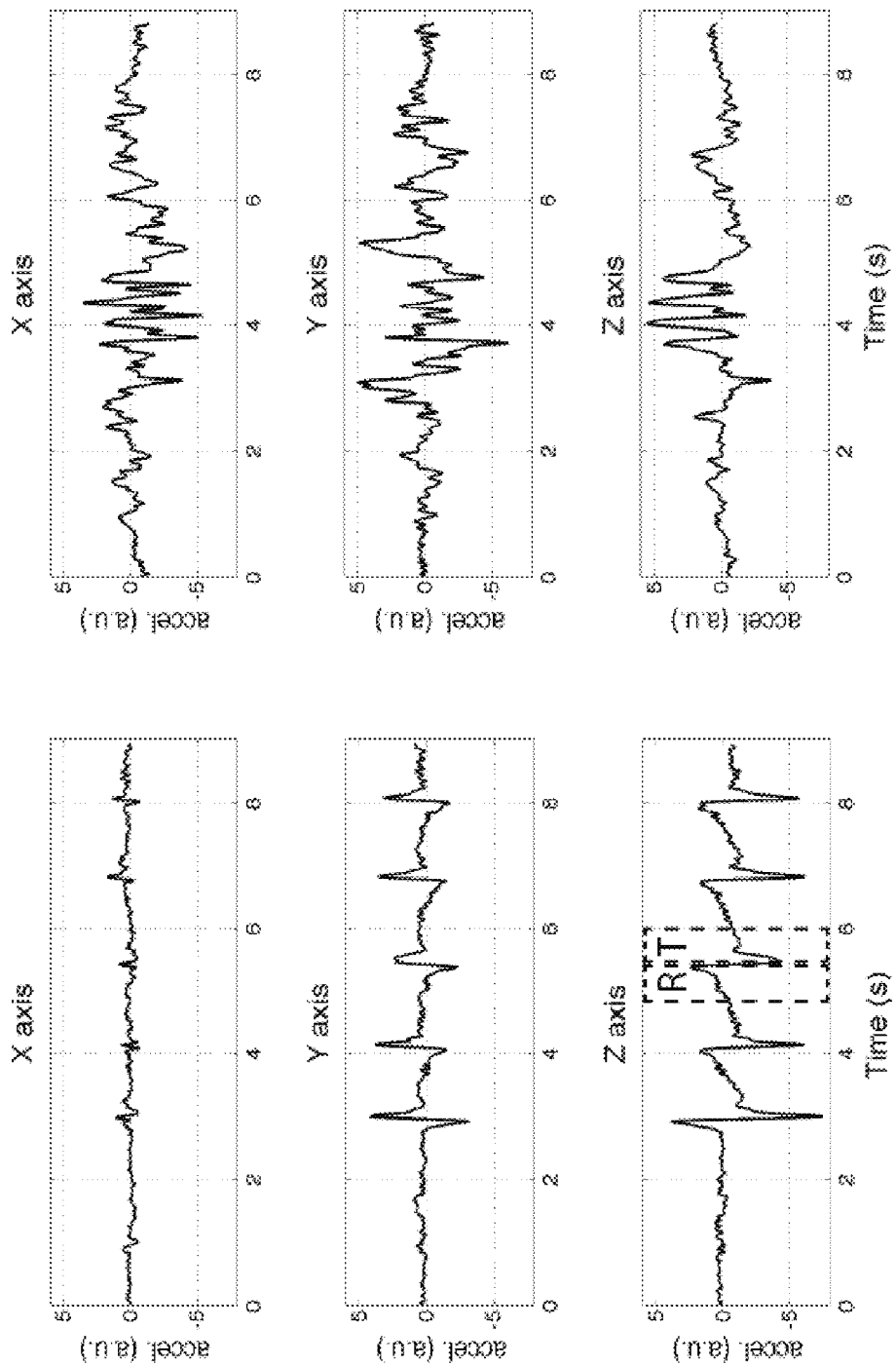
FIG. 4 illustrates fingertip dynamics patterns during "virtual touch" gesture and uncontrolled free-swing and scratching movements in at least one embodiment.

FIG. 4 illustrates fingertip dynamics patterns during five repetitions of the "virtual touch" gesture (left column) and uncontrolled free-swing and scratching movements (right column) as measured by a 3D accelerometer. During virtual touch motion signal is negligible on the x axis (top row) as the touching gesture was oriented in the Y-Z plane. The box R (bottom left) marks the time interval where the hand was receding away from the screen in preparation for the virtual touch. The box T marks a much faster acceleration pattern (downward spikes) followed by quiescence ("stop-point"). No such patterns are generated during uncontrolled hand movements (right column).

FIG. 5 depicts a flow chart illustrating how a UCI can be implemented in software. Dotted lines indicate an optional loop for eye gaze direction estimation.

Flow of Control in the UCI in Some, but not Necessarily All, Embodiments

An example of the algorithmic implementation of the UCI based on the user-centric principle is shown in a flowchart of FIG. 5. The algorithm consists of a number of nested loops for face detection, face recognition, estimation of head/facial orientation and fingertip position, estimation of the on-screen coordinates aimed at by a finger/hand and finally detection of intentional touch-like and other hand gestures. An additional side loop (broken lines in FIG. 5) is implemented for eye gaze direction tracking. This task is optional as eye gaze tracking is usually possible only when a face is within a short range from the Camera. The eye-tracking algorithm makes use of an optional infrared light source.

An extended version of this algorithm includes tracking of body pose and approach dynamics as well as tracking of the dynamics of the head/face rotation and detection of a user's intention to interact with the screen and interaction parameters.

The nested loops are distributed in a manner that maximizes computational efficiency of the algorithm. For example, the dynamic finger/hand motion pattern detection is enabled only once a range of prerequisite conditions is met (face is detected and recognized, and the hand/fingers are pointing to the relevant graphical on-screen elements).

Functionality and Applications in Some, but not Necessarily All, Embodiments

Some embodiments enable touch-free interaction with a plurality of information screen-bearing or other image-producing devices, while taping into a user's touch-screen-based interaction experience. Various embodiments can be implemented in a plurality of ways including but not limited to the following:

UCI interface can be implemented as a software add-on for existing server, desktop, laptop and all-in-one computers running any modern operating system including but not limited to Microsoft Windows, Apple OS X, Unix, Google Chrome OS, various Linux varieties (Ubuntu, Fedora, Red Hat, CentOS, Arch, Debian, OpenSUSE, Slackware), BSD, FreeBSD and other OS's.

UCI interface can be implemented as smart TV software and used as described above.

UCI interface can be implemented as software on mobile devices such as smartphones, tablets running Android, iOS, Blackberry, Symbian, Windows RT and other OSes and be used as above.

UCI interface can be implemented as a set of embedded algorithms in a separate device, a UCI Coprocessor (UCIC), that attaches to the said computers, and receives inputs from a video device (a depth and/or 2D camera). The UCIC device processes 2D and/or 3D video stream and produces a sequence of commands that are passed to the said operating systems via driver or other software installed on the host computer. The UCIC device offloads computational demands of the UCI (2D/3D image processing, user and user action recognition and tracking) and can be connected to the host computer via USB or other analogous port or installed internally as an extension board.

A UCIC device can be attached to a TV or a projector and pass control commands to the TV/projector either via HDMI (or analogous) port or infrared (IrDA) remote control commands.

Multiple UCI-bearing (mobile and stationary) devices may run in a co-operative mode so that gestures, recognized simultaneously (or sequentially) on a plurality of mobile and plurality of stationary devices are used to generate a coordinated sequence of commands for data and on-screen image transfer and for synchronization of the said devices.

Description regarding finger may apply to hand. Description regarding hand may apply to finger. Description regarding head may apply to eye. Description regarding eye may apply to head. Description regarding use of a hand or finger, and/or regarding use of a head or eye may extend to use of other body parts or non-human objects. For example, the position of other body parts instead of a finger and hand (e.g., an arm) may be determined, tracked and used to identify a target object in a similar manner to how a position of a finger or hand is determined, tracked and used to identify a target object. The position of a forehead, an eye brow, a nose, an ear, a mouth, or other feature of a head may be determined, tracked and used to identify a target object in a similar manner to how a position of a head or eye is determined, tracked and used to identify a target object as disclosed elsewhere herein. The position of a non-human physical object that is held by or attached to a finger and hand (e.g., a pointing object like a pen, clothing with a reference feature, or other object) may be determined, tracked and used to identify a target object in a similar manner to how a position of a finger or hand is determined, tracked and used to identify a target object. The position of a non-human physical object that is held by or attached to a head (e.g., glasses, hat, and the like) may be determined, tracked and used to identify a target object in a similar manner to how a position of a head or eye is determined, tracked and used to identify a target object as disclosed elsewhere herein.

Various types of image capturing devices are contemplated, including cameras, lasers, ultrasound, and other devices that collect data about positions of objects (e.g., hand, finger, head, eye, or other) in 2 or 3 dimensional space.

Additional Aspects

One or more aspects may relate to systems, methods, means and computer program products for identifying and manipulating a target object that is displayed on a screen by determining a user's intention to interact with that target object. Systems may include one or more processors operable to implement one or more methods described herein. Computer program products may include a non-transitory computer usable medium having a computer readable program code embodied therein that is adapted to be executed to implement one or more methods described herein.

In accordance with some aspects, method steps may: determine a position of a first body part of a user using a first video frame from a camera; determine a position of a second body part of the user using the first video frame; and identify a target object, from among graphical objects displayed on a screen, based on the position of the first body part and the position of the second body part.

In accordance with some aspects, the target object is identified based on a geometric relationship between the position of the first body part and the position of the second body part. In accordance with some aspects, the geometric relationship between the position of the first body part and the position of the second body part corresponds to an estimated sight line that intersects the first body part, the second body part, and the target object. In accordance with some aspects, the first body part is the user's eye, the second body part is the user's finger or hand, and the position of the user's finger or hand is disposed between the user's eye and the target object so as to occlude a first part of the screen where the target object is displayed in the user's field of vision. In accordance with some aspects, the target object is identified based on a first geometric relationship between the position of the first body part and the position of the second body part, and a second geometric relationship between a position of the camera and a position of the target object on the screen. In accordance with some aspects, the target object is identified based on a relationship between a position of the camera and coordinates of the target object on the screen.

In accordance with some aspects, method steps may: detect an orientation of the first body part with respect to the screen, wherein the target object is identified only when an orientation of the first body part is directed towards the target object, and wherein the target object is not identified when the orientation of the first body part is not directed towards the target object. In accordance with some aspects, method steps may: determine a position vector of the first body part relative to a position of the camera; determine a position vector of the second body part relative to the position of the camera; determine where an estimated sight line of the user intersects the screen based on the position vector of the first body part, the position vector of the second body part, and the position of the camera relative to a position of the screen; and identify the target object based on where the estimated sight line intersects the screen. In accordance with some aspects, method steps may: determine another position of the second body part using a second video frame from the camera; identify a first point on an image plane associated with the camera, wherein the first point corresponds to a projection of a first one of the positions of the second body part onto the image plane when the user points at a calibration object displayed on the screen; identify a second point on the image plane, wherein the second point corresponds to a projection of a second one of the positions of the second body part onto the image plane when the user points at a target object displayed on the screen; identify a third point on the image plane that corresponds to a projection of the first body part onto the image plane; and identify the target object based on first, second and third positions on the image plane. In accordance with some aspects, method steps may: identify a first point on an image plane associated with the camera, wherein the first point corresponds to a location of the second body part along a calibration sight line between the first body part and a calibration object displayed on the screen; identify a second point on the image plane, wherein the second point corresponds to a location of the second body part along a target sight line between the first body part and a target point on the screen; identify a third point on a second plane that corresponds to the second point on the image plane, wherein the second plane is parallel to the screen and intersects the image plane; identify a fourth point on the second plane that corresponds to the first point on the image plane; determine a scaling factor based on a position of the calibration object relative to a position of the camera, and further based on a location of the fourth point on the second plane; and identify the target object based on the scaling factor and the location of the third point on the second plane. In accordance with some aspects, method steps may: identify a fifth point on the image plane, wherein the fifth point corresponds to a location of the first body part on at least one of the calibration sight line and the target sight line, wherein the second plane intersects the fifth point on the image plane, and wherein the scaling factor is determined based on the position of the calibration object relative to the position of the camera, and further based on the location of the fourth point relative to the fifth point on the second plane. In accordance with some aspects, method steps may: determine one or more other positions of the second body part using one or more other video frames from the camera; detect a gesture made by the second body part when some of the positions of the second body part collectively indicate an acceleration pattern of movement followed by a period of quiescence; and determine that at least one of the positions of the second body part do not indicate part of the acceleration pattern of movement followed by a period of quiescence.

In accordance with some aspects, method steps may: detect a gesture made by the second body part when positions of the second body part corresponding to a plurality of video frames indicate an acceleration pattern of movement followed by a period of quiescence. In accordance with some aspects, the gesture manipulates the target object. In accordance with some aspects, the gesture includes the position of the second body part of the user that was determined using the first video frame. In accordance with some aspects, the acceleration pattern of movement is associated with movement of the second body part in at least two dimensions. In accordance with some aspects, the acceleration pattern of movement is associated with movement of the second body part in three dimensions. In accordance with some aspects, method steps may: detect a gesture made by the second body part when positions of the second body part corresponding to a video stream collectively indicate a movement in two dimensions without touching the screen. In accordance with some aspects, method steps may: detect a gesture made by the second body part when positions of the second body part corresponding to a video stream collectively indicate a movement in three dimensions. In accordance with some aspects, method steps may: detect a virtual touch gesture based on a plurality of positions of the second body part corresponding to a plurality of video frames from the camera.

Other Aspects

The specific order components disclosed herein are examples of exemplary approaches. Based on design preferences, the specific order components may be rearranged, and/or components may be omitted, while remaining within the scope of the present disclosure unless noted otherwise. The previous description of the disclosed embodiments is provided to enable any person skilled in the art to make or use the present disclosure. Various modifications to these embodiments may be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The various illustrative systems, methods, logical features, blocks, modules, components, circuits, and algorithm steps described herein may be implemented, performed, or otherwise controlled by suitable hardware known or later developed in the art, or by software executed by a processor and also inclusive of any number of processors), or by both. A processor (also referred to as a "processing device") may perform any of the processing steps, computational steps, method steps, or other functionality disclosed herein, including analysis, manipulation, conversion or creation of data, or other operations on data. A processor may include a general purpose processor, a digital signal processor (DSP), an integrated circuit, server, other programmable logic device, or any combination thereof. A processor may be a conventional processor, microprocessor, controller, microcontroller, or state machine. A processor can also refer to a chip. The term "processor" may refer to one, two or more processors of the same or different types. It is noted that the terms "computer" or "computing device" or "user device" or the like may refer to devices that include a processor, or may refer to the processor itself. Software may reside in RAM memory, flash memory, ROM memory, EPROM memory, EEPROM memory, registers, hard disk, a removable disk, a CD-ROM, or any other form of storage medium. A "memory" may be coupled to a processor such that the processor can read information from and write information to the memory. The storage medium may be integral to the processor. Software may be stored on or encoded as one or more instructions or code on a computer-readable medium. Computer-readable media be any available storage media, including non-volatile media (e.g., optical, magnetic, semiconductor) and carrier waves that transfer data and instructions through wireless, optical, or wired signaling media over a network using network transfer protocols. Aspects of systems and methods described herein may be implemented as functionality programmed into any of a variety of circuitry, including. Aspects may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips that may be referenced throughout the above description may be represented by voltages, currents, electromagnetic waves, magnetic fields or particles, optical fields or particles, or any combination thereof. Computing networks may be used to carry out aspects and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source. "Data" and "information" may be used interchangeably. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover any of the items and all of the items in a list. "Some" and "any" and "at least one" refers to one or more. The term "device" may comprise one or more components (e.g., a processor, a memory, and/or a screen). Features in system and apparatus figures that are illustrated as rectangles may refer to hardware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. A data source which is depicted as a single storage device may be realized by multiple (e.g., distributed) storage devices. A data source may include one or more types of data sources, including hierarchical, network, relational, non-relational, object-oriented, or another type of data source. As used herein, computer program products comprising computer-readable media including all forms of computer-readable medium except, to the extent that such media is deemed to be non-statutory, transitory propagating signals. Computer program products may include a non-transitory computer usable medium having a computer readable program code embodied therein that is adapted to be executed to implement the various methods disclosed herein and claimed.

While various embodiments of the present disclosure have been described in detail, it may be apparent to those skilled in the art that the present disclosure can be embodied in various other forms not specifically described herein.

The invention claimed is:

1. A system for identifying a target object that is displayed on a screen, the system comprising at least one processor that:
    determines a position of a first body part of a user using a first video frame from a camera;
    determines a position of a second body part of the user using the first video frame;
    identifies a region of a screen based on the position of the first body part and the position of the second body part;
    identifies a target object, from among graphical objects displayed on the screen, that corresponds to the region on the screen;
    identifies a first point on an image plane associated with the camera, wherein the first point corresponds to a location of the second body part along a calibration sight line between the first body part and a calibration object displayed on the screen;
    identifies a second point on the image plane, wherein the second point corresponds to a location of the second body part along a target sight line between the first body part and a target point on the screen;
    identifies a third point on a second plane that corresponds to the second point on the image plane, wherein the second plane is parallel to the screen and intersects the image plane;
    identifies a fourth point on the second plane that corresponds to the first point on the image plane;
    determines a scaling factor based on a position of the calibration object relative to a position of the camera, and further based on a location of the fourth point on the second plane; and
    identifies the target object based on the scaling factor and the location of the third point on the second plane.

2. The system of claim 1, wherein the processor:
    identifies a fifth point on the image plane, wherein the fifth point corresponds to a location of the first body part on at least one of the calibration sight line and the target sight line, wherein the second plane intersects the fifth point on the image plane, and wherein the scaling factor is determined based on the position of the calibration object relative to the position of the camera, and further based on the location of the fourth point relative to the fifth point on the second plane.

3. The system of claim 1, wherein the processor:
    detects a gesture made by the second body part when positions of the second body part corresponding to a plurality of video frames indicate an acceleration pattern of movement followed by a period of quiescence.

4. The system of claim 3, wherein the gesture manipulates the target object.

5. The system of claim 3, wherein the gesture includes the position of the second body part of the user that was determined using the first video frame.

6. The system of claim 4, wherein the acceleration pattern of movement is associated with movement of the second body part in at least two dimensions.

7. The system of claim 5, wherein the acceleration pattern of movement is associated with movement of the second body part in at least two dimensions.

* * * * *